United States Patent [19]
Sato

[11] Patent Number: 6,009,403
[45] Date of Patent: *Dec. 28, 1999

[54] TRAVEL PLAN PREPARING DEVICE

[75] Inventor: Koji Sato, Toyota, Japan

[73] Assignee: Toyota Jidosha Kabushiki Kaisha, Toyota, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/838,337

[22] Filed: Apr. 8, 1997

Related U.S. Application Data

[63] Continuation-in-part of application No. PCT/JP96/01598, Jun. 13, 1996.

[30] Foreign Application Priority Data

Aug. 9, 1995 [JP] Japan .................................... 7-203615
Oct. 2, 1995 [JP] Japan .................................... 7-254851

[51] Int. Cl.$^6$ .................................................. G06F 17/60

[52] U.S. Cl. .............................. 705/6; 701/201; 701/202; 340/990; 340/995

[58] Field of Search .................. 705/6, 13; 701/200, 701/202, 208, 209, 211, 213, 23, 82; 340/990, 995

[56] References Cited

U.S. PATENT DOCUMENTS

| | | | |
|---|---|---|---|
| 4,796,189 | 1/1989 | Nakayama et al. ...................... | 701/209 |
| 4,926,336 | 5/1990 | Yamada .................................... | 701/202 |
| 5,006,985 | 4/1991 | Ehret ........................................ | 705/1 |
| 5,031,104 | 7/1991 | Ikeda et al. .............................. | 701/209 |
| 5,231,584 | 7/1993 | Nimura et al. ........................... | 701/202 |
| 5,237,499 | 8/1993 | Garback .................................... | 705/6 |

(List continued on next page.)

FOREIGN PATENT DOCUMENTS

| | | |
|---|---|---|
| 63-251900 | 10/1988 | Japan . |
| 4-213761 | 8/1992 | Japan . |
| 4-261576 | 9/1992 | Japan . |
| 6-138818 | 5/1994 | Japan . |
| 6-223296 | 8/1994 | Japan . |
| 3007786 | 12/1994 | Japan . |
| 8-106492 | 4/1996 | Japan . |

OTHER PUBLICATIONS

Rand McNally, "Shifts Trip Planning Into High Gear With Multimedia Features", Tripmaker 1996 Edition(TM).
Patent Abstracts of Japan, vol. 012, No. 300, No. 63073371, Apr. 1988.
IBM Technical Disclosure Bulletin, vol. 37, No. 04A, "Entertainment Guide Enabling", Apr. 1994, p. 567.
Management Science, vol. 25, No. 12, "An Optimal Algorithm for Sales Representative Times Management", Dec. 1979, pp. 1197–1207.
Robotics, Cim and Automation Emerging Technologies, vol. 2 of 3, "A Planning Method Combining Rule–Bases and Optimization Algorithms for Transportation Network", Nov., 1992, pp. 902–906.

*Primary Examiner*—Allen R. MacDonald
*Assistant Examiner*—Hani M. Kazimi
*Attorney, Agent, or Firm*—Pillsbury Madison & Sutro

[57] ABSTRACT

A travel plan preparing device used for preparing a travel plan by accessing a data base from terminal and acquiring information about service facilities existing on the route from the starting place to the destination. An area or desired kind of service is inputted through an input device (110) and transmitted to the data base (100) through a transmitter-receiver (116). When an area is inputted, the data base (100) retrieves the information about the service facilities in the designated area and transmits the information to the terminal. When a desired kind of service is inputted, the data base (100) transmits the information about the positions of the pertinent service facilities and the electronic controller (ECU)(114) of the terminal calculates the distribution of the service facilities on a map, selects the area which meets most the inputted condition, and displays the area on a display device (12). A GPS navigation system (112) searches the route to the selected area and prepares a travel plan.

9 Claims, 14 Drawing Sheets

U.S. PATENT DOCUMENTS

| | | | |
|---|---|---|---|
| 5,272,638 | 12/1993 | Martin et al. | 701/202 |
| 5,331,546 | 7/1994 | Webber et al. | 705/6 |
| 5,353,034 | 10/1994 | Sato et al. | 342/457 |
| 5,377,113 | 12/1994 | Shibazaki et al. | 701/209 |
| 5,467,268 | 11/1995 | Sisley | 705/9 |
| 5,559,707 | 9/1996 | DeLorme et al. | 701/200 |
| 5,568,390 | 10/1996 | Hirota . | |
| 5,623,404 | 4/1997 | Collins | 705/9 |

200 CELL

◎ CURRENT LOCATION

| COMPLEMENT | NUMBER OF PERSONS | ESTIMATED COST (YEN/PERSON) |
|---|---|---|
| COUPLE | 2 TO 3 | 2000 OR LESS |
| SOLITARY TRAVELER | 4 TO 5 | 5000 OR LESS |
| GROUP | 6 OR MORE | 10,000 OR LESS |
| FAMILY: INCLUDING INFANT | | 40,000 OR LESS |
| FAMILY: ADULTS ONLY | | |

TRAVEL PLAN PREPARING DEVICE

This is a Continuation-in-Part of International Appln. No. PCT/JP96/01598 filed Jun. 13, 1996 which designated the U.S.

TECHNICAL FIELD

This invention relates to an apparatus for preparing itineraries taking into consideration information relating to service facilities along a route from a start location to a final location.

BACKGROUND ART

Recently, systems useful for traveling by vehicle have been proposed for accessing databases from in-vehicle terminals to acquire necessary information.

For example, in the information transfer system for vehicles in Japanese Patent Laid-Open Publication No. Hei 4-261576, a system is disclosed where a user connects to a center station by calling the center as needed, and receives and then stores or displays information at the vehicle after retrieving the necessary information. As a result, transmitting a vehicle position and final location enables maps, traffic information, and livelihood information for the region to be easily obtained.

However, when this sort of system is used to obtain information and plan a specific itinerary, there are often instances, after a final location has been decided, where one desires to know what sort of service facilities are available in the vicinity of a route from a start location to the final location. In a particular example, when a trip is not for business but for sight-seeing and therefore not only for reaching a final location, it becomes possible to plan a versatile and efficient itinerary if it is known beforehand what types of facilities are available along a route. In this sort of instance, planning an itinerary was heretofore troublesome and time consuming since tasks involved specifying a region from a service access menu, then confirming service facilities in that region.

DISCLOSURE OF INVENTION

The present invention with regard to a problem having the above-mentioned prior art has its object in providing an itinerary preparing apparatus capable of quickly learning the service facilities and planning an efficient itinerary while taking into account these service facilities.

To achieve the above-mentioned object, a first invention is an itinerary preparing apparatus for preparing an itinerary by accessing a database from a terminal, characterized by an input means for specifying either an area or service classification as a retrieval condition, a retrieval means for retrieving, based on the specified retrieval condition, either the above-mentioned area or service classification that was not specified, and a presenting means for presenting results of the retrieval that were obtained. The database stores data on service facilities sorted by classification and information on their locations to enable an area-specific service classification retrieval or a classification-specific area retrieval of service facilities so that desirable service facility information can be easily obtained. A service classification refers to a classification of the type of service a service facility offers, such as restaurant, amusement park, or art gallery, as examples.

A second invention is an itinerary preparing apparatus for preparing an itinerary by accessing a database from a terminal, characterized by the input means for specifying a prescribed area as a retrieval condition, the retrieval means for retrieving facilities located within the above-mentioned area, and the presenting means for distinguishing the service classification of facilities obtained in the retrieval and presenting the above-mentioned service classification on the terminal based on specific conditions. By automatically presenting service classifications related to the itinerary using the area as a retrieval condition in this manner, it becomes unnecessary for an operator to retrieve information on service facilities each time for a certain region. A specific condition signifies an evaluation condition for ordering service classifications.

A third invention is characterized by a prescribed area which is an area including a route from a start location to a final location. By having the prescribed area include the start location to the final location in this manner, it becomes easy to grasp the service facilities located along the route.

A fourth invention is characterized by the presenting means presenting information based on the number of facilities corresponding to the various service classifications when multiple classifications exist. The existence of multiple service classifications signifies that facilities offering different services are located within the prescribed area, such as restaurants and art galleries, and the number of facilities is counted for each classification. The order of presentation is determined by the magnitude of the count in each classification so that the classifications are presented according to this order. For example, if there are 10 restaurants and 2 art galleries, the restaurants are presented with priority. This permits one to become easily acquainted with an abundance of service facilities. Generally, since these abundant classified facilities include diverse information, it then becomes possible to use more comfortable service facilities. Furthermore, it is preferable to consider the distance to the route, for example, when selecting a specific service facility.

A fifth invention is characterized by a prescribed area comprising a set of multiple small areas along the route from a start location to a final location, and by presenting means presenting classifications by small area based on the estimated times a user will pass each small area if multiple service classifications exist. The estimated times are calculated according to the distances from the start location to each small area, traffic conditions, and so forth. If, for example, the estimated time to pass a certain small area is around 12 o'clock noon, facilities are presented with priority to restaurants located in the small area. As a result, it becomes possible to use service facilities agreeing with the traveling conditions of the user and to prepare an efficient and comfortable itinerary.

A sixth invention is characterized by the presenting means presenting classifications for each small area based on the continuous traveling time of the user if multiple service classifications exist, where the prescribed area comprises a set of multiple small areas along the route from a start location to a final location. Generally, as the continuous traveling time (including the continuous traveling time for a vehicle) increases, the desire to use rest facilities, such as rest stops and coffee shops, also increases. Accordingly, when the continuous traveling time of the user attains or exceeds a fixed value, facilities are presented with priority to rest facilities, for example, in the expected small area. As a result, a user-friendly and comfortable itinerary can be prepared.

A seventh invention is characterized by further including a guidance means for guiding the user according to an itinerary prepared by including the presented results. As a result, itinerary preparation to execution can be processed consistently, and a comfortable trip can be realized while lightening the load of the traveler or user (including driver). The guidance means, namely, a navigation system, prepares a recommended route for executing the prepared itinerary, and includes various apparatuses for guiding the traveler through audio and map data along the route prepared by detecting the current location.

An eighth invention is characterized by the input means specifying multiple service classifications, the retrieval means calculating the extent of distribution by area for service facilities corresponding to each specified service classification and then retrieving an optimum area based on the results thereof, and the presenting means presenting the optimum area that was obtained from the retrieval. The specifying of multiple service facilities refers to, for example, the specifying of "ski" and "hot springs", or "tennis" and "art galleries". In this case, service facilities coinciding with the various classifications have different distributions, and an overlapping area of both distributions represents an area coinciding with both purposes.

A ninth invention is characterized by the retrieval means including a counting means for counting the number of above-mentioned service facilities by area, and a selecting means for selecting an area having the largest number of service facilities as the optimum area. By taking the area having the largest number of facilities as the optimum area in this manner, an area most likely to satisfy a multiple of usage classifications can be automatically selected.

A tenth invention is characterized by the retrieval means including an area changing means for changing the size of each area if there is no significant difference in the number of service facilities between areas counted by the counting means, and the counting means recounting the service facilities by area after the area sizes have been changed. As described above, an area having the largest number of facilities becomes the optimum area. However, there are instances where, depending on the area sizes, there is no difference in the distribution numbers for the areas. Examples include instances where a purpose is hardly influenced by natural conditions, or where facilities are evenly distributed over a relatively wide area even if a purpose is influenced by natural conditions. In these instances, changing the sizes of areas will create a difference between areas and make it possible select an optimum area.

An eleventh invention is characterized by the input means further specifying the complement of users and the retrieval means calculating the extent of distribution by area of service facilities coinciding with specified service classifications and user complement, and retrieving an optimum area based on the results thereof. The user complement signifies the complement of persons who are to use the facilities, such as a couple (two people), a family of four, and so forth. Depending on the service facility, there may be a preferable user complement for using the facility. Thus, by performing a search while including the complement of persons, an area can be selected to better coincide with the purpose of use.

A twelfth invention is characterized by further including a route searching means for performing a prescribed route searching process using an optimum area and searching for a recommended route from a start location to a final location. After selecting an optimum area, the area, as well as routes to service facilities within the area obtained from a retrieval, are presented to the vehicle driver so that itinerary planning to execution can be processed collectively and an easy-to-use system can be configured.

A thirteenth invention is a computer-readable medium having stored thereon instructions which, when executed by a processor, cause the processor to perform the steps of:

inputting and specifying either an area or service classification as a retrieval condition; retrieving, based on the specified retrieval condition, said area or service classification that was not specified; and presenting results obtained from retrieval.

A fourteenth invention is a computer-readable medium having stored thereon instructions which, when executed by a processor, cause the processor to perform the steps of:

inputting and specifying a prescribed area as a retrieval condition; retrieving facilities located within said area; and distinguishing service classifications of the facilities obtained from retrieval, and presenting said service classifications on the terminal based on specific conditions.

MODES FOR CARRYING OUT THE INVENTION

The embodiments of this invention are described, with reference to the drawings, as terminals using in-vehicle terminals as examples.

FIRST EMBODIMENT

Figure 1:
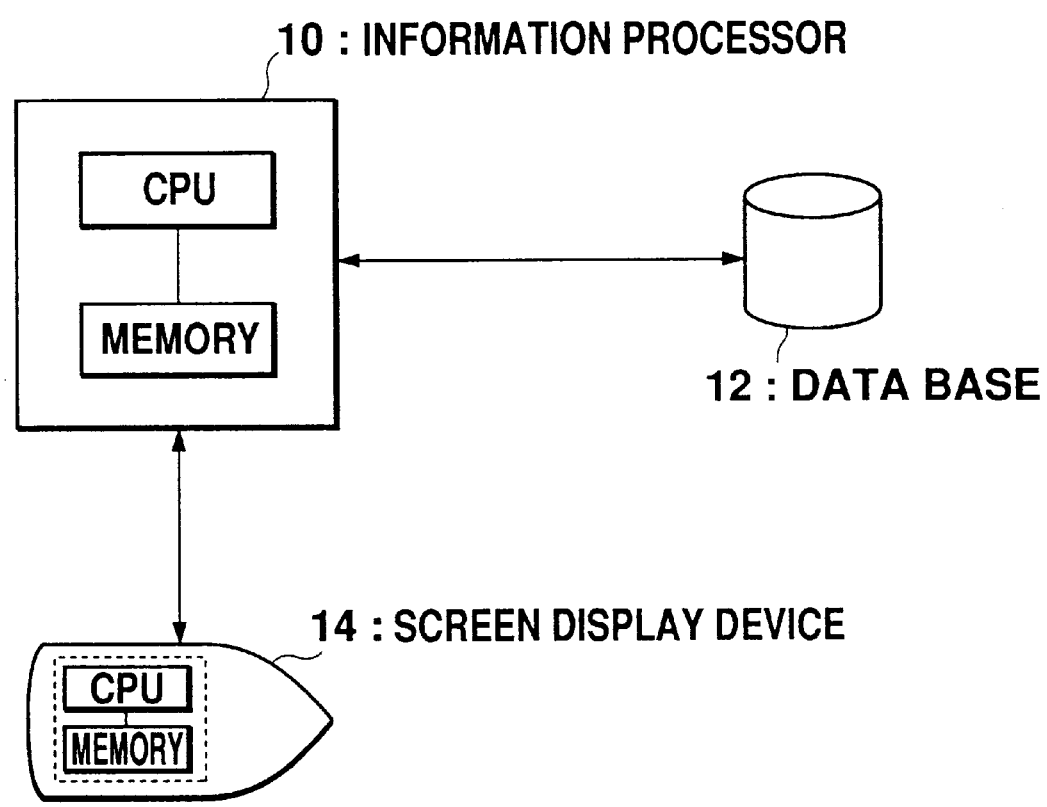
FIG. 1 is a system block diagram of an embodiment of this invention.

FIG. 1 shows a block diagram of this embodiment. An information processor 10, which comprises a CPU and memory, is carried in a vehicle. Information processor 10 accesses a database 12, obtains desired information, and outputs the information to a screen display device 14. Database 12 functions as a retrieval means and a presenting means and includes memory for storing information on various types of service facilities, traffic information, and map data, and a processor for processing data according to a processing program for a retrieval process. Service facility information refers to a service classification, description, and positional information (latitude and longitude) of a service facility. Traffic information can be obtained, for example, by accessing a road management center. Although database 12 is basically an infrastructure, it may also be carried in a vehicle as a high capacity storage medium, such as a CD-ROM or a hard disk. Screen display device 14 displays on its screen results obtained from access and also functions as an input device by displaying touch switches. Screen display device 14 is carried in a vehicle as an integral unit with information processor 10. It is also possible to configure a system so that only screen display device (input device) 14 is carried in the vehicle, while both information processor 10 and database 12 are part of the infrastructure. In this case, screen display device 14 will require a CPU and memory as shown by the dashed line in FIG. 1. This is necessary for input data to be transmitted to the infrastructure and for data sent from the infrastructure to be received and displayed on the screen.

The above describes the basic configuration. Information processor 10 or screen display device 14 is dynamically linked to a navigation system (not shown) carried in a vehicle and receives a prepared itinerary and guides the vehicle according to the itinerary. The navigation system may use a known configuration having a minimum configuration of map data, guide route storage memory, current location detector (such as GPS), and a processor for collating a current location and a guide route, then guiding the vehicle by screen displays or voice instructions.

Hereinafter, examples are described where information processor 10 and screen display device 14 are carried in a vehicle, and database 12 is part of the infrastructure. An operator or user (driver) inputs necessary conditions through screen display device 14 for preparing an itinerary. These conditions include final location, intermediate location, estimated travel cost, departure time, number of persons, complement of persons, number of days, and so forth. Information processor 10 encodes the conditions that were input and transmits them to database 12. As an example of transmitting means, a car telephone may be considered. Database 12 prepares, according to a retrieval processing program, an itinerary agreeing with the conditions that were input, then sends it in reply to information processor 10. For the itinerary, a route to the final location and service facility information on the route are prepared. Information processor 10 outputs the received itinerary as a recommended plan to screen display device 14.

Figure 2A:
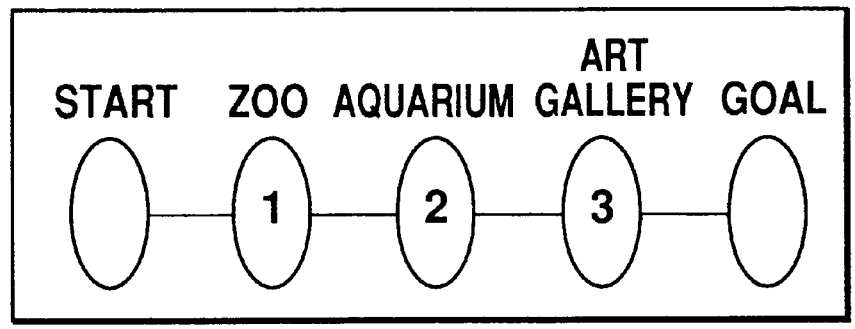
FIG. 2A is a conceptual diagram of an itinerary.
Figure 2B:
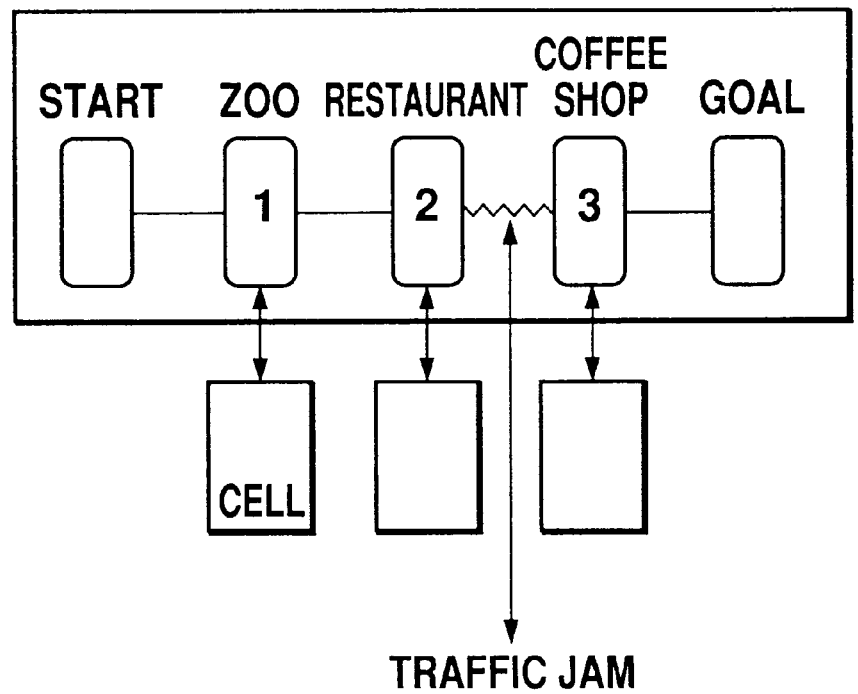
FIG. 2B is a conceptual diagram of another itinerary.

FIG. 2A and FIG. 2B show conceptual diagrams of itineraries. FIG. 2A is an itinerary showing a route from a start location (current location) to a final location, and service classifications as service facility information along the route. The route until the final location is divided into small areas, or cells, and a service classification is presented for each cell based on an order of increasing number of service facilities. Namely, zoos having the largest numbers in cell 1, aquariums having the largest numbers in cell 2, art galleries having the largest numbers in cell 3, and so forth are presented for each cell. In concrete terms, any service facility belonging to a classification may be selected, and the display of all facilities in a list or the presentation of only the closest facilities to the route may be considered.

Although this kind of facility selection scheme is extremely easy to use for the operator since service facilities in the vicinity of the route are automatically presented, it is also important to decide where to eat meals or where to rest when planning an itinerary. Accordingly, as shown in FIG. 2B, ordered classifications in this embodiment are further presented as service facility information by taking into consideration the estimated time the cell will be passed and the continuous traveling time (continuous driving time). Although aquariums have the largest number of facilities in cell 2, as mentioned above, restaurants are presented instead of aquariums for the service classification if the estimated time cell 2 will be passed is around noon. Naturally, in this case, the system may be configured to allow the above-mentioned estimated time to be adjusted thereabouts by taking into consideration the times the various service facilities are to be used. Furthermore, although art galleries have the most facilities in cell 3, rest facilities, such as coffee shops, are presented instead of art galleries if a traffic jam is located between cell 2 and cell 3 and it is estimated a considerable length of time will be spent riding the vehicle until cell 3 is reached. As a result, the operator (driver) can obtain a flexible and comfortable itinerary, thus eliminating the heretofore need for the operator to search for service facilities located along a route. If the presented itinerary (recommended plan) is unacceptable, an operator-based input will cause the classifications having the next order of priority to be displayed in succession.

Next, an itinerary shown in FIG. 2B is prepared and the process until execution is described in detail. Note that the process for preparing the itinerary shown in FIG. 2A is included in the first half of the process to be described in the following.

Figure 3:
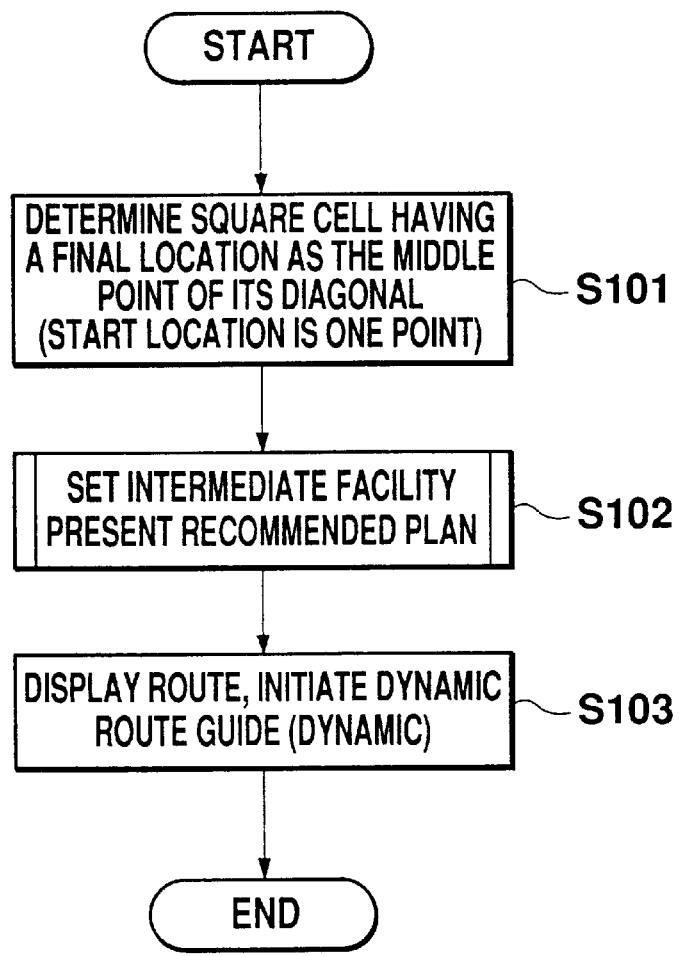
FIG. 3 is a flowchart for a general procedure.
Figure 4:
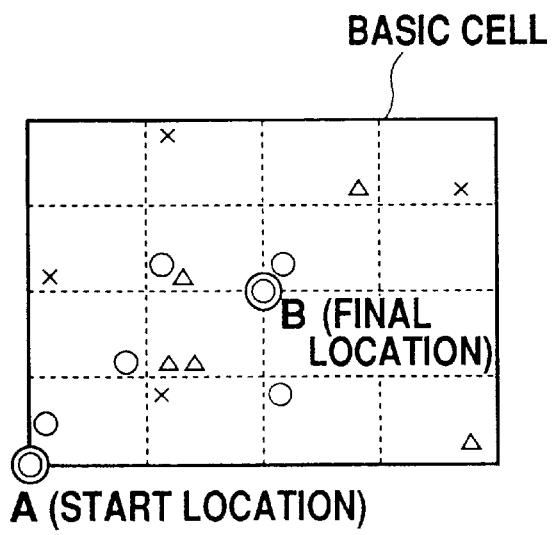
FIG. 4 illustrates a basic cell.

FIG. 3 shows a flowchart for a general procedure in the present embodiment. Conditions that were input through screen display device 14 are transmitted to information processor 10. When a request for itinerary preparation is received at database 12, map data is first used at database 12 to determine a square cell having a diagonal line with a start location (current location) as one point and a final location as its middle point (Slol). The start location may be input as a condition by the operator or the current location detected by the navigation system may be transmitted to database 12. FIG. 4 shows an example of a square determined in this manner. Double circles in the figure represent start location A and final location B. Hereinafter, this square area is called a basic cell. This basic cell becomes a work area for subsequent processes, and the service facilities included in the basic cell are retrieved according to their positional information. The service facilities are shown in the figure as ○ and Δ and so forth. Next, the facilities to be visited are set within the basic cell, a recommended travel plan is prepared, then sent in reply to information processor 10 (S102). At information processor 10, the received recommended travel plan is supplied to the navigation system to initiate route guidance (S103).

Figure 5:
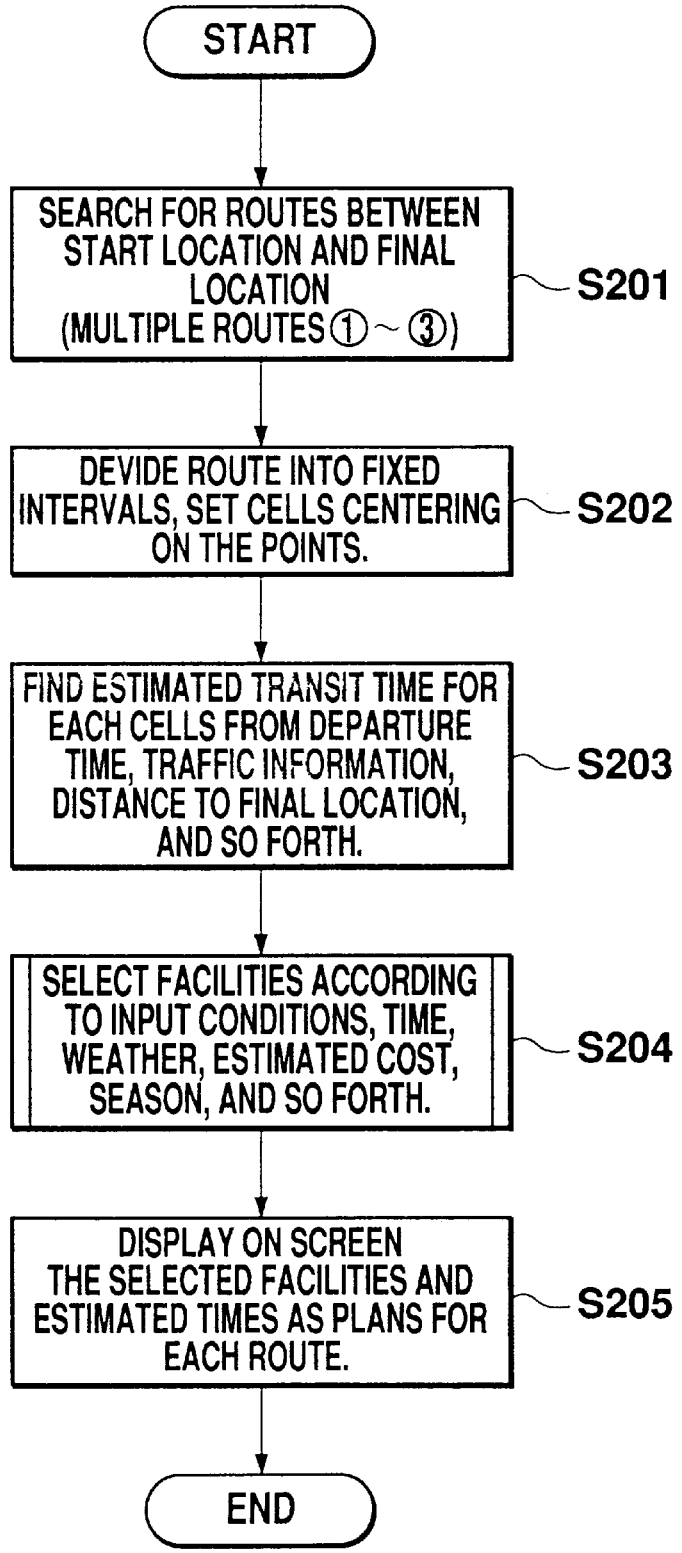
FIG. 5 is a flowchart of itinerary preparation.
Figure 6:
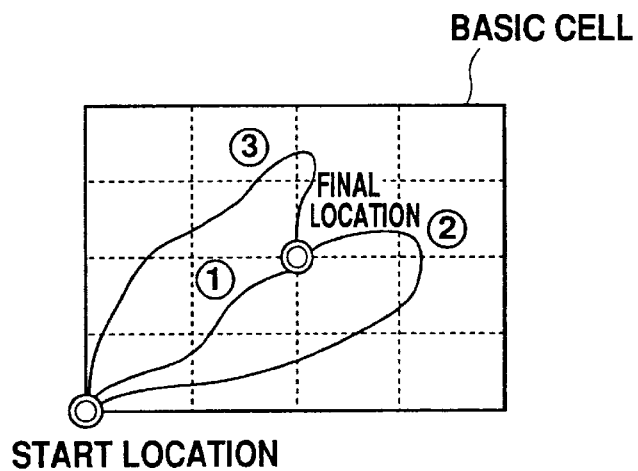
FIG. 6 illustrates routes from a start location to a final location.

FIG. 5 details the processes in S102. The map data in the basic cell is used to search for routes from the start location (current location) to the final location, and several recommended routes are extracted (S201). Route searching may employ known search algorithms, such as by Dijkstra or Nicholson. In this embodiment, it is assumed that three routes were obtained (1, 2, 3). FIG. 6 conceptually shows these three routes. Next, the extracted routes are divided into fixed intervals (for example 50 km), and cells centering on the points are set (S202). These cells are the same cells that were illustrated in FIG. 2 and correspond to small areas. The size of the cells can be set as desired, for example, to squares having 30 km sides. After the cells have been set, the estimated transit time for each cell is calculated (S203) at database 12 from various conditions, such as departure time, traffic information, and final location. In concrete terms, the estimated time cell 1 will be passed is 10:30 since the departure time is 10:00 (a.m.), the distance to cell 1 is 50 km, and there is no traffic jam, and the estimated time cell 5 will be passed is 13:50 since chronic traffic jams occur between cell 4 and cell 5.

Figure 7:
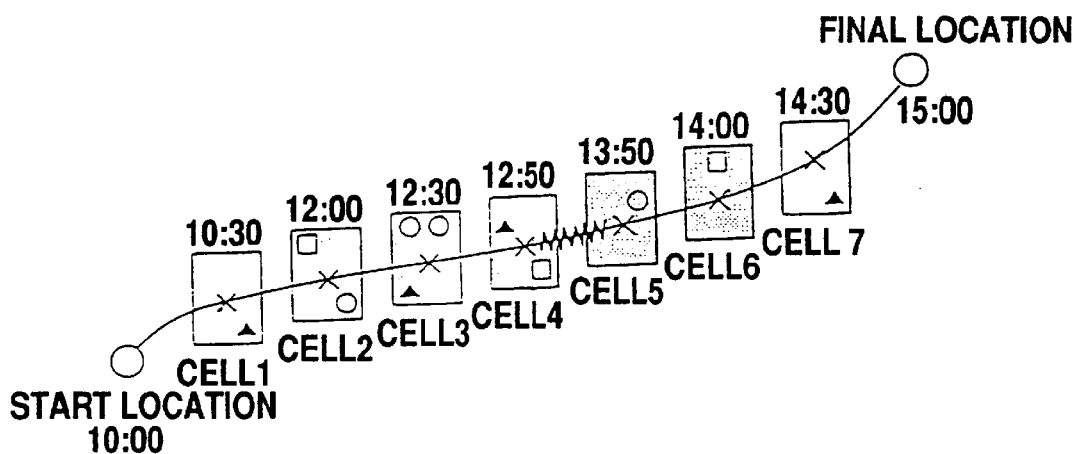
FIG. 7 illustrates the estimated transit times for each cell.

FIG. 7 shows an example of the estimated transit times calculated in this manner for the cells. The cells are numbered from 1 to 7. The numbers above the cells are the estimated transit times. Symbols ○ and Δ within the cells represent service facilities included in the respective cells. A wavy line between cell 4 and cell 5 indicates a traffic jam has developed along a route shown as a solid line from the start location to the final location.

Next, at database 12, a service classification is selected (S204) in each cell according to input conditions, estimated transit times, weather, estimated cost, season, and so forth. Details on classification selection processing are described later. Finally, the selected facilities and estimated times are sent in reply to information processor 10 as recommended travel plans and displayed on screen for each route (S205).

Figure 8:
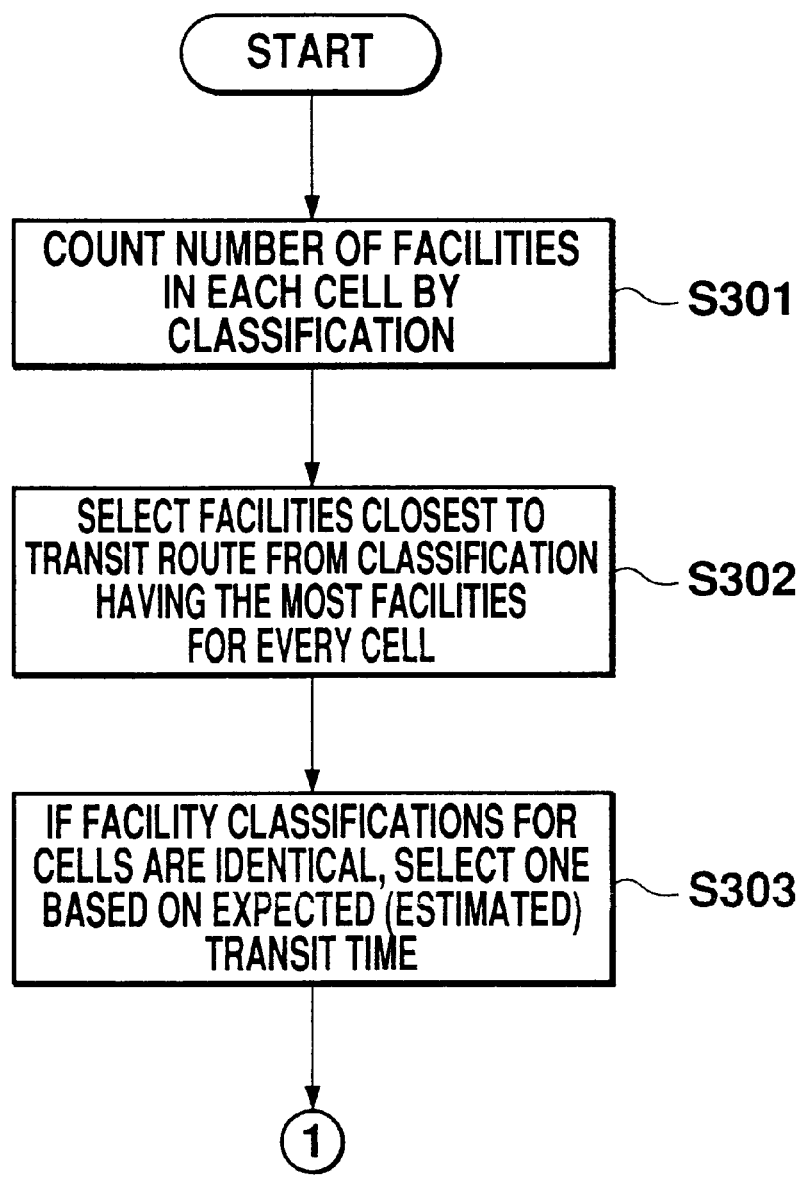
FIG. 8 is a flowchart for a facility selection procedure (part 1).
Figure 9:
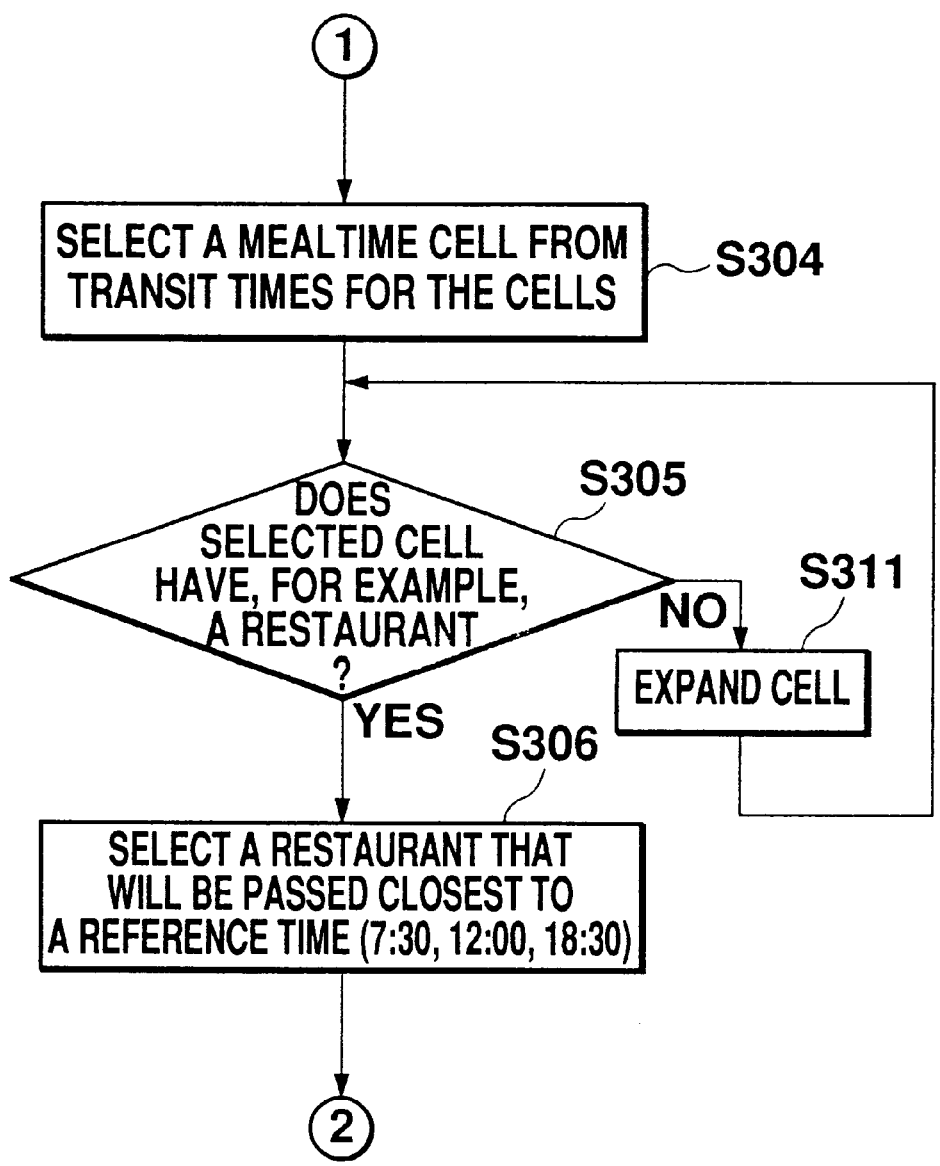
FIG. 9 is a flowchart for a facility selection procedure (part 2).
Figure 10:
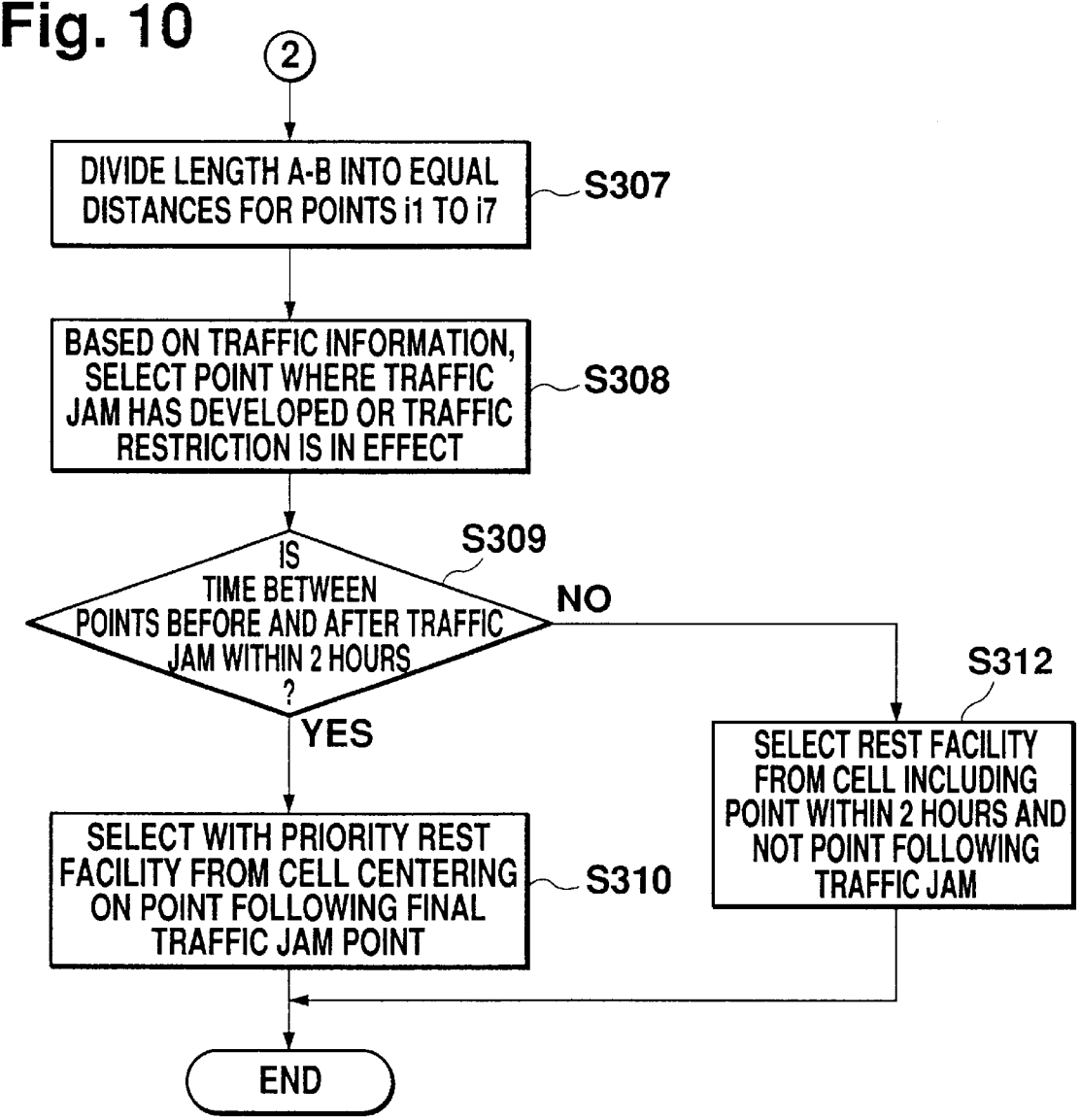
FIG. 10 is a flowchart for a facility selection procedure (part 3).

FIG. 8, FIG. 9, and FIG. 10 detail the facility selection processing of S204. First, at database 12, the facilities in each cell are counted by classification (S301). This counting is performed using the classification codes included in the service facility information. Next, the classifications are ordered in increasing number for each cell, and a facility closest to the transit route is selected (S302) from among the facilities belonging to the classification having the largest number of facilities. For example, if cell 1 has two art galleries, one restaurant, and three coffee shops, a coffee shop is presented as a recommended facility for cell 1, and if coffee shop A is closest to the route among coffee shops A, B, and C, coffee shop A is selected for cell 1. Distances to the transit route are calculated according to transit route data and positional data for service facilities. Then, if the facility classifications are identical for the various cells, only one is selected (S303) according to estimated transit times. For example, if art galleries were selected for both cell 1 and cell 2, and the opening time of the art galleries is 11:00, the art galleries are not open at the estimated transit time for cell 1, so the art gallery in cell 2 is selected. The itinerary in FIG. 2A was prepared in this manner.

Next, cells that will be passed during mealtimes (6:30–8:30, 11:30–13:30, 17:00–20:00) are selected (S304) from the estimated transit times for the cells. Taking FIG. 7 as an example, cells 2, 3, and 4 are the mealtime cells. Then, it is judged (S305) whether there are any service facilities in the selected cells where meals can be eaten, such as restaurants. If there are restaurants, the restaurant in the cell that will be passed at a time closest to the reference times (7:30, 12:00, 13:30) is selected (S306). On the other hand, if there are no restaurants in the selected cells, cells 2, 3, and 4 are temporarily expanded (S311), such as to squares having 40 km sides, and again it is judged (S305) whether there are any dining facilities, such as restaurants. The mealtimes may also be specified by the operator through an input of conditions. In this case, database 12 may extract a cell that is expected to be passed at the specified time and select a dining facility.

If there are many dining facilities, their type of cuisine (Chinese, ethnic, Japanese, traditional Japanese, western, and so forth) are further distinguished. The number of restaurants for each cuisine is counted and the dining facilities may be presented in the order of increasing number.

On the other hand, for cells that are expected to be passed at times other than mealtimes, such classifications as art galleries, zoos, amusement parks, shrines and temples, cultural properties, and so forth, may be extracted.

Figure 11:
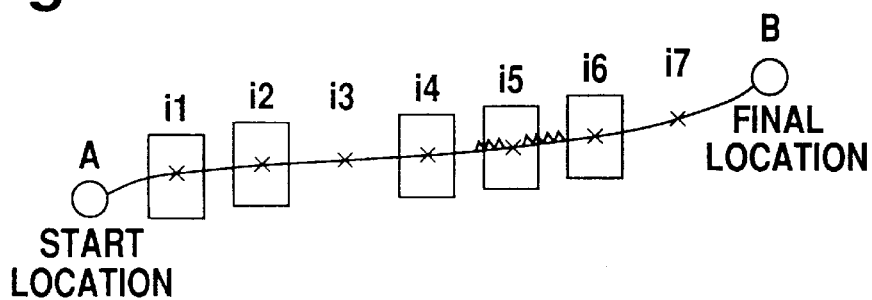
FIG. 11 illustrates division points.

After a service facility has been selected according to transit time, database 12 further divides (S307) the length between the start location (A) and the final location (B) into equal distances. The division points from the setting of cells on the route can be used for these division points, and for convenience, are set as i1–i7. FIG. 11 shows set points i1–i7 as "x" symbols. Next, points where there are traffic jams or where traffic restrictions are in effect are selected (S308) according to traffic information. Traffic information can be obtained from the road management center as described above or another source, and it is preferable to obtain the data according to day of the week or time period. In the example of FIG. 11, a traffic jam has developed at point i5 so this point is selected. Then, an evaluation is performed to determine whether passage between the points before and after the traffic jam or traffic restriction requires 2 hours, namely, whether the vehicle's continuous traveling time (continuous driving time) will exceed 2 hours (S309). Since the estimated transit times for the cells are calculated by taking into consideration traffic jams, this evaluation, in concrete terms, is performed according to the estimated transit times for the cells before and after where the traffic jam has developed. For example, in FIG. 7, since a traffic jam has developed between cell 4 and cell 5, and the transit time for cell 4 is 12:50 and the transit time for cell 5 is 13:50, the evaluated time is within 2 hours. Then, with the evaluated time within 2 hours, a rest facility, such as a coffee shop, is selected with priority (S310) from a cell centering on a point (i6 in the example of FIG. 11) following the final traffic jam point. If the time between the points before and after the traffic jam is evaluated to exceed 2 hours, a rest facility is selected (S312) from a cell that includes not the point after the traffic jam but a point within 2 hours (i5 in the example of FIG. 11). As a result, since rest facilities are presented with priority at locations where it is judged rest is required, an itinerary can be prepared to include safety considerations. If more than 2 hours is required, rest facilities including toilet facilities may also be selected with priority.

In this manner, the service facilities located along a route to the final location are automatically retrieved in this embodiment, the classification having the largest number of facilities by area is presented, and an itinerary is prepared by changing service classification to agree with the vehicle's estimated transit time and by changing service classifications taking into consideration traffic conditions. This results in a comfortable trip making effective use of the service facilities along the route. If, for example, the final location was set to a seaside district, the classifications of the facilities (such as  art gallery,  hot spring, ** seafood restaurant, and so forth) located in that vicinity are distinguished. An itinerary for visiting an art gallery, a seafood restaurant, and a hot spring can be presented, so a concrete image of the trip is easy to grasp and an itinerary can easily be planned.

Although an in-vehicle terminal was described as an example for the terminal in this embodiment, other information terminals, such as a PID portable terminal, are also applicable.

SECOND EMBODIMENT

Figure 12:
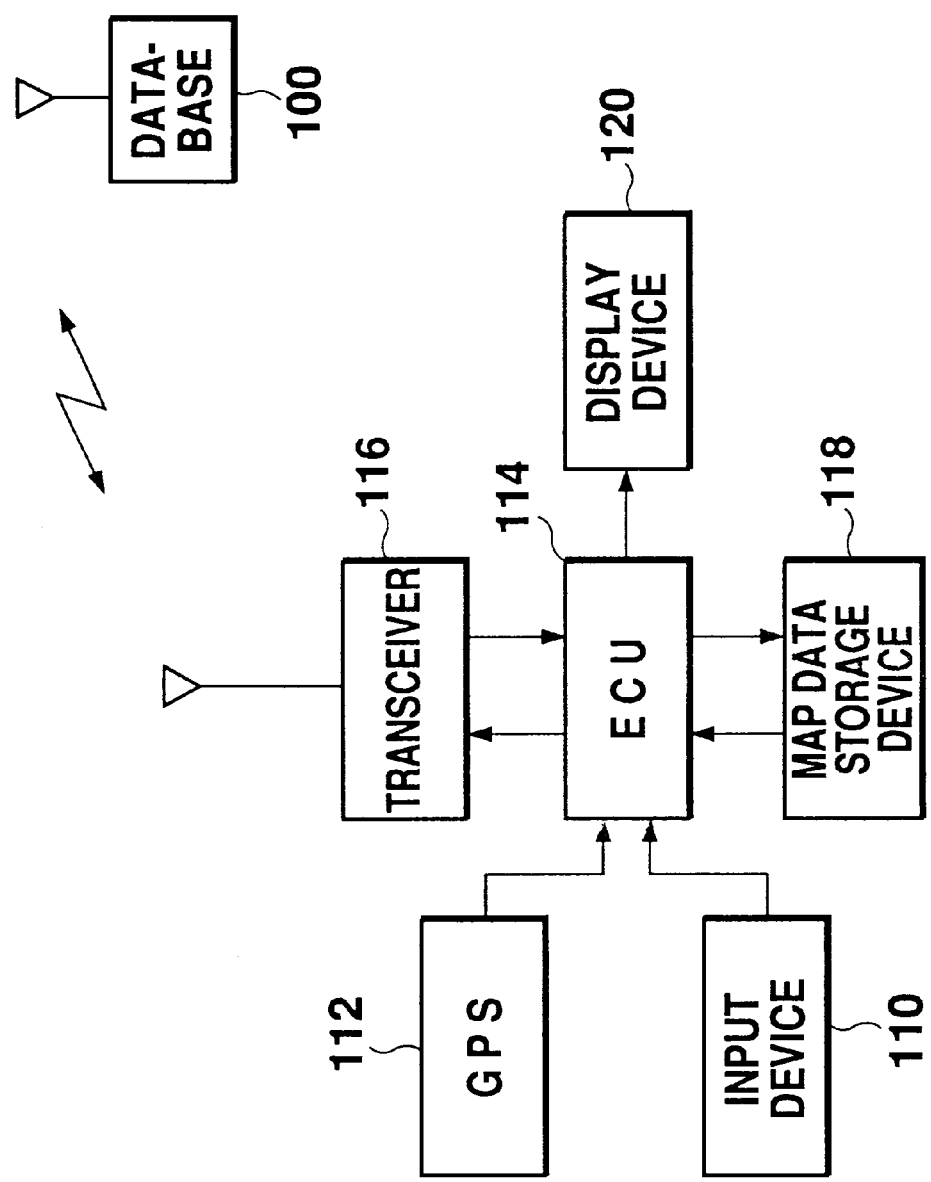
FIG. 12 is a system block diagram of another embodiment according to the present invention.

FIG. 12 shows a system block diagram of this embodiment. An input device 110 is provided in the vicinity of a driver's seat of a vehicle for usage classification input by a user. A single (such as ski slope) or multiple usage classifications (such as ski slope and hot spring) are allowed. An input method may comprise a display on screen of a list of purposes, then a selection from that list. In this case, it is preferable to integrate input device 110 with a display device 120 to be described later, and to provide touch switches that are displayed on screen. Input data is output to an electronic control unit or ECU 114. A GPS 112 in a vehicle receives radio waves from GPS satellites, detects the position of the vehicle, and outputs the positional information to ECU 114. Besides GPS 112, distance sensors and direction sensors can be combined to detect the vehicle's position. ECU 114 comprises a CPU, memory, and I/O devices, and transmits data that was input through input device 110 to database 100 through a transceiver 116. Positional information (such as latitude and longitude information) as well as the type of service of various service facilities are stored in database 100, and service facilities coinciding with the specified classifications are retrieved and sent in reply to transceiver 116. Transceiver 116 outputs the data of the received retrieval results to ECU 114. At ECU 114, as the retrieved data is stored into memory, the retrieved data is collated with map data stored in a map data storage device 118, such as a CD-ROM, and a process to be described later is performed to select an area most closely coinciding with the input purpose and to display the area on display device 120 as a recommended area. If the recommended area is acknowledged by the user, a search is performed for a route to the desired final location within the area using search algorithms, such as the well known Dijkstra algorithm, and the route obtained from the search is displayed on display device 120 to guide the user.

A characteristic of this embodiment lies in the processing for when the user inputs multiple classifications. Thus, the following description takes an instance where the user inputs "I want to go to a ski slope, then a hot spring", for example. In this case, data on ski slopes and hot springs in Japan, for example, will be sent from database 100, and the ski slope data and hot spring data together with their positional information will be stored in the memory of ECU 114.

Figure 13:
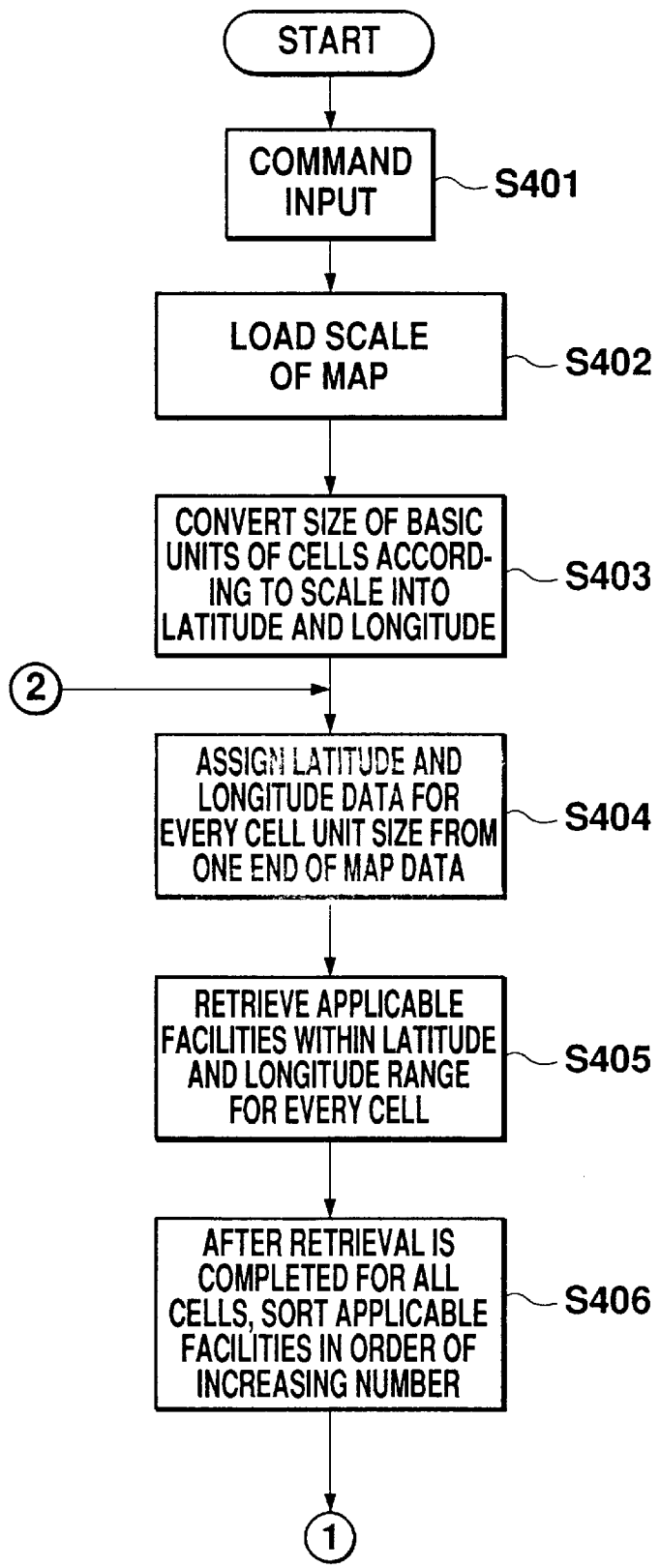
FIG. 13 is a flowchart for a general procedure (part 1).
Figure 14:
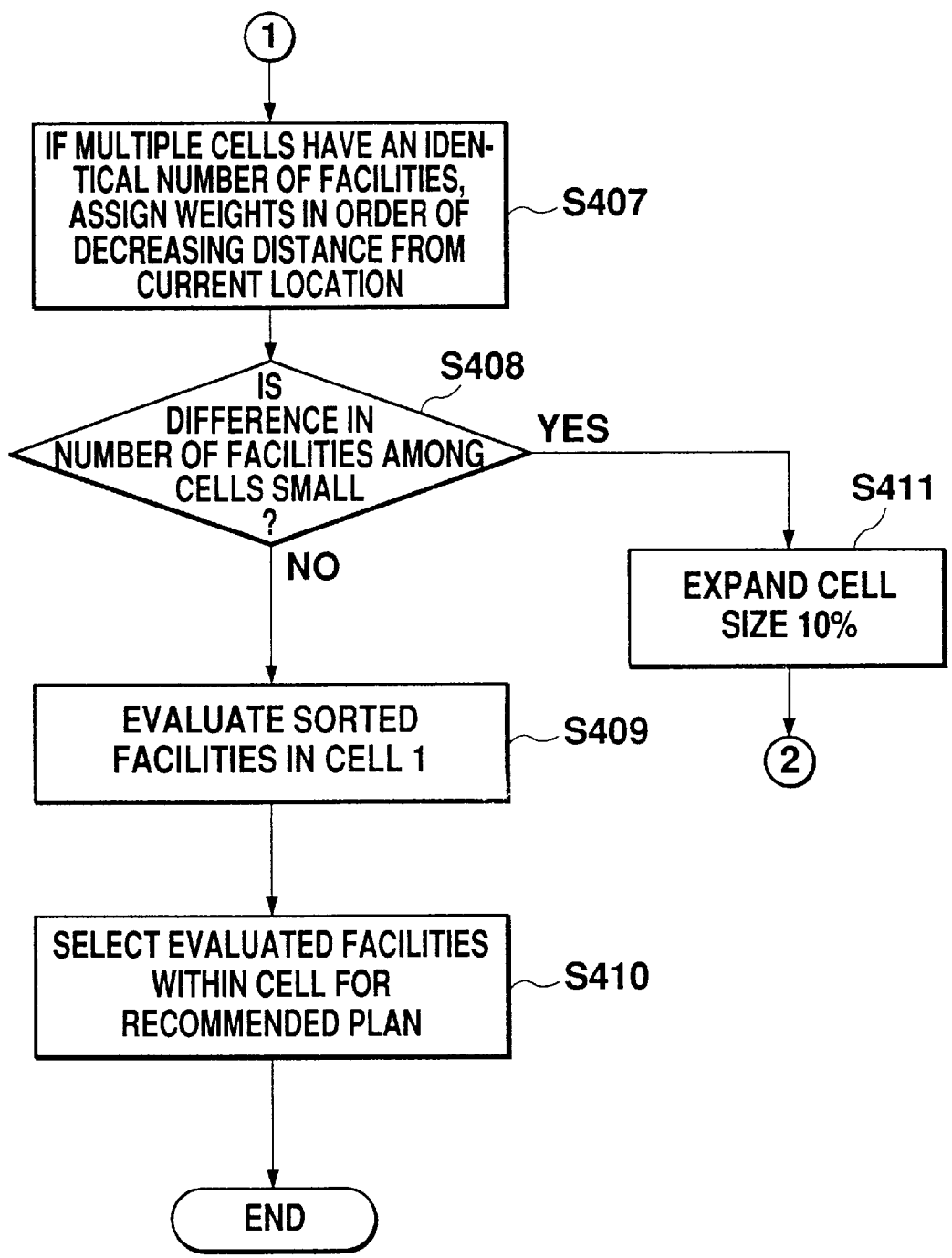
FIG. 14 is a flowchart for a general procedure (part 2).
Figure 15:
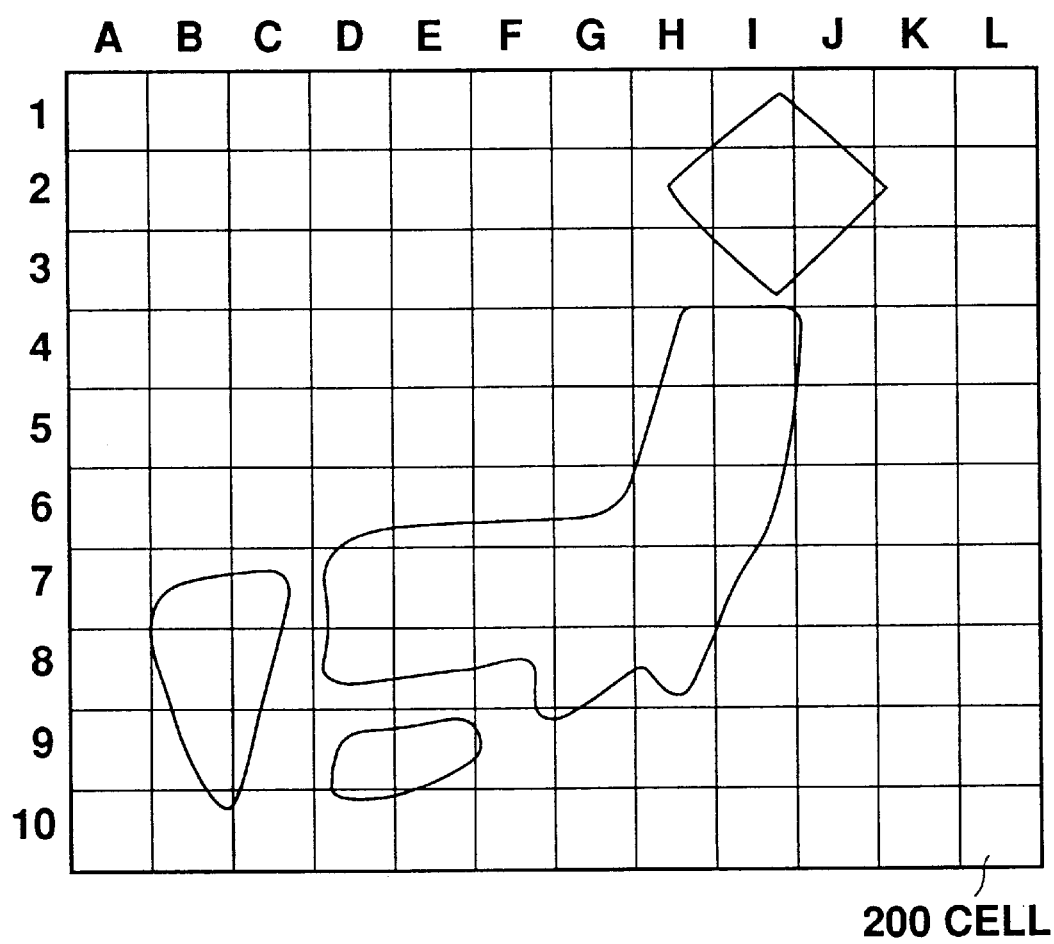
FIG. 15 illustrates cells.

FIG. 13 and FIG. 14 show procedural flowcharts for ECU 114. First, when the user inputs a classification (or purpose) command through input device 110 (S401), ECU 114 reads the map data stored in map data storage device 118 and loads its scale (S402). A scale furnished beforehand for the map data may be used. Next, ECU 114 converts the size of basic units of a cell indicating an area into latitude and longitude according to the scale (S403). FIG. 15 illustrates an instance where a map of Japan has been divided into 120 sections, where each section is a cell 200. The size of cell 200 varies according to the scale for the map data (size becomes larger as the scale becomes larger), and based on this scale, the size of cell 200 is converted at S403 into latitude and longitude. For example, the size of cell 200 at a scale of 1.5 km per side becomes 1 minute after converting to latitude and longitude, and at a scale of 1.0 km becomes 40 seconds in latitude and longitude.

Figures 16, 17:
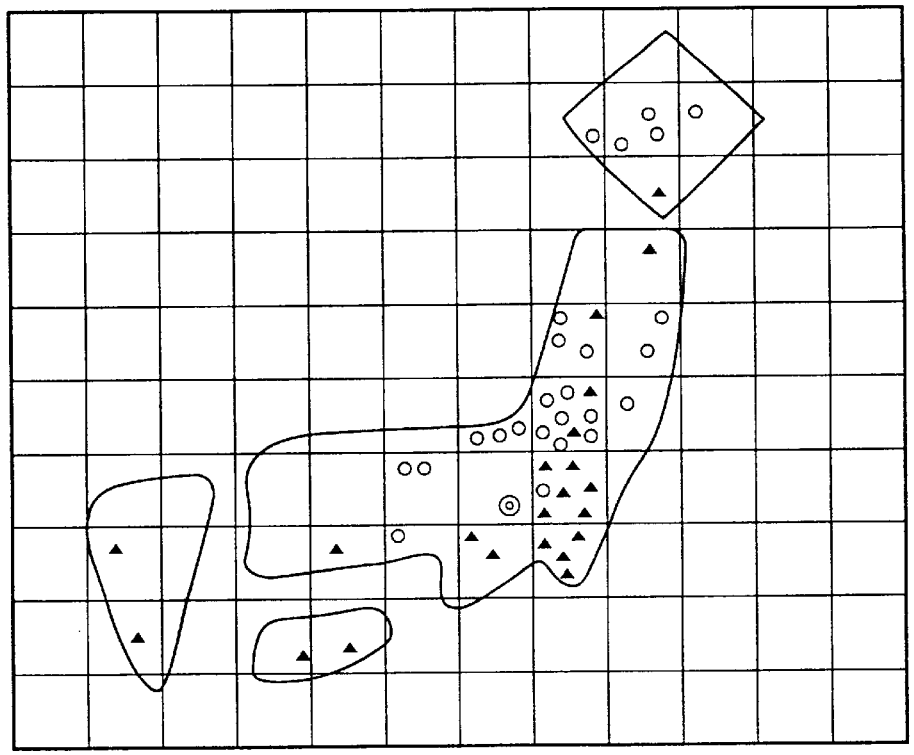
FIG. 16 illustrates a distribution of facilities.
FIG. 17 illustrates other input parameters displayed on a screen.
Figure 18:
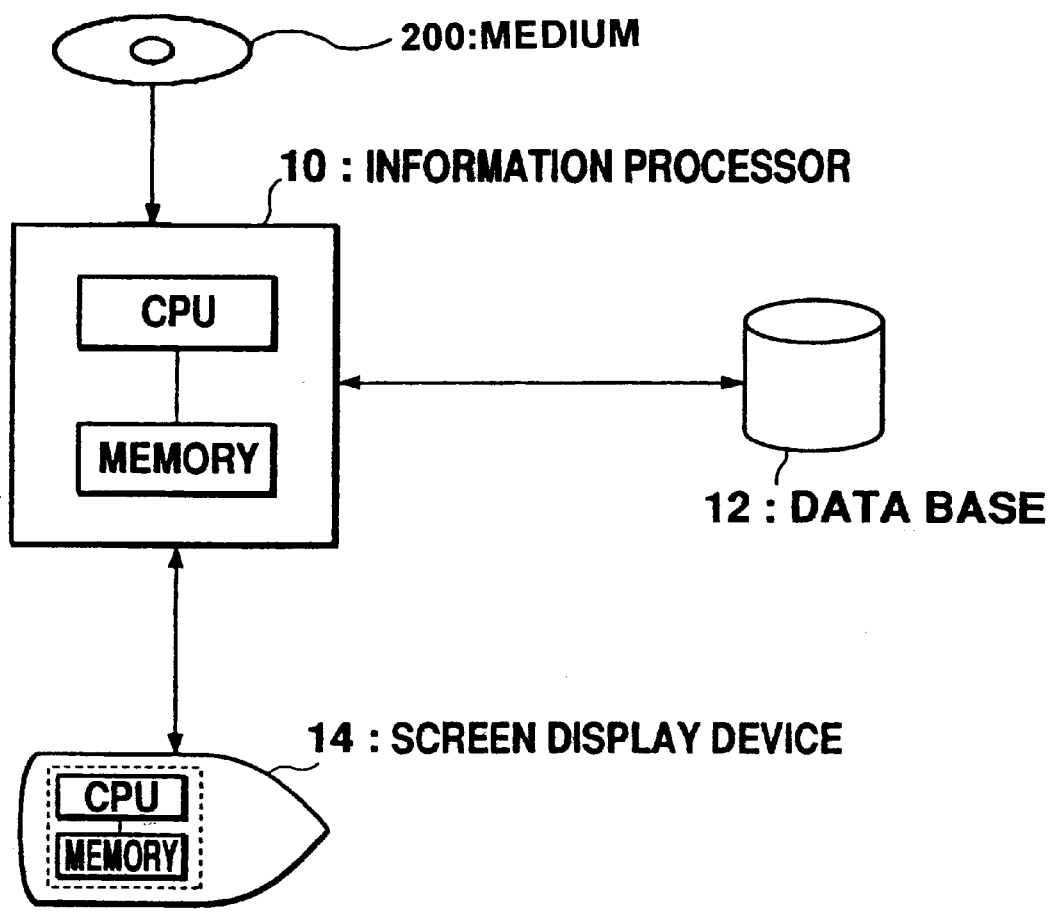
FIG. 18 is an explanatory diagram showing a computer-readable medium on which a program for executing an itinerary preparing operation is stored.

After the cell's size has been converted to latitude and longitude, ECU 114 assigns latitude and longitude data for every cell size from one end of the map data (S404). For example, cell H8 has latitude 35 degrees 40 minutes to 35 degrees 41 minutes and longitude 139 degrees 41 minutes to 139 degrees 42 minutes. After latitude and longitude ranges have been assigned for all cells, facilities located within the latitude and longitude range assigned for every cell are retrieved (S405). As described above, the service facility data that was sent in reply from database 100 includes positional data of latitude and longitude, and based on this latitude and longitude, ECU 114 judges in what cell a service facility is located. For example, if the position of ski slope A that was sent in reply from database 100 is north latitude 35 degrees, 40 minutes, 30 seconds and east longitude 139 degrees, 40 minutes, 30 seconds, ski slope A is located in cell H8. Likewise, if the position of hot spring B is north latitude 37 degrees, 0 minutes and east longitude 138 degrees, 0 minutes, hot spring B is located in cell G6. FIG. 16 illustrates an example where service facilities (ski slopes and hot springs) are assigned to cells in this manner. White circles in the figure represent ski slopes and black triangles represent hot springs.

When the retrieval for all cells has been completed (or when assignment to cells has been completed for all service facilities), ECU 114 counts the number of service facilities located within a cell for every cell and calculates the extent of their distribution, then sorts the cells in order of increasing number of facilities (S406). For example, if there are two ski slopes and eight hot springs in cell H8, the extent of distribution for cell H8 is 10. On the other hand, if there are ten ski slopes and six hot springs in cell H6, the extent of distribution for cell H6 is 16, and H6 will be ranked above cell H7.

If multiple cells have an identical number of facilities when the cells are sorted in order of increasing extent of distribution, ECU 114 assigns weights in order of decreasing distance from the current location to determine the cell order (S407 in FIG. 14). For example, if the current location is cell G7, and the extent of distributions for cell E7 and cell F8 are identical, cell F8, which is closer to cell G7, is ranked higher. Then, when the order has been determined for all cells, it is judged whether or not the difference in extent (number of facilities) for the cells is small, namely, whether or not there is a significant difference in extent for the cells (S408). This judgment is a process for confirming whether or not there is a significance in the cell ordering. For example, if the difference between the extent of the cell ordered number 1 and the extent of the cell ordered number 2 is compared with a prescribed value (for example 2) and is within the prescribed value, it can be judged that there is no significant difference. Naturally, mean square errors of the extent of all cells may be calculated and judged to determine whether or not they are within the prescribed value. If, as a result of the judgment, it is judged there is no significant difference, it is assumed there is a problem in the cell size so the cell size is expanded 10% (S411). Then, the process from the above-mentioned S404 is repeated. This is based on the fact that although no difference develops in the extent of the cells with small cell sizes if service facilities are dispersed over a relatively wide range, the difference in the extent with other cells has a tendency to increase if cell sizes are expanded since the districts covering the cells become large in distance. The expansion of cell size is repeatedly performed until it is judged at S408 that a significant difference has developed.

On the other hand, if a significant difference in extent for cells has developed, cell ranked number 1 is displayed on display device 120 as an optimum area agreeing with the purpose. If the user acknowledges the area, ECU 114 further evaluates (S409) the service facilities (ski slopes, hot springs) within the cell ranked number 1 so as to present a route to the final location. This evaluation is performed by further subdividing the cell, for example, and by executing the processes of S404 to S407 with respect to the small subdivided cells. The cell subdivision is repeated as necessary so that a cell including both ski slope and hot spring can be reduced to a minimum cell size.

After evaluation of facilities within the cell has been completed and the cell has been reduced to a minimum cell size (including one or several ski slopes and hot springs), ECU 114 presents recommended plans that combine these ski slopes and hot springs and displays on display device 120 (S410) routes to the relevant ski slopes and hot springs as recommended routes. For example, if two ski slopes (S1, S2) and two hot springs (H1, H2) are included in a minimum cell, 4 combinations of (S1, H1), (S1, H2), (S2, H1), and (S2, H2) are presented as recommended plans. If the user selects a combination, a recommended route for the selected plan is displayed on display device 120. Searching for a route to the final location can be performed by using a known route searching algorithm (such as the Dijkstra algorithm).

As described above, the user can easily obtain in this embodiment, simply by inputting multiple service classifications, routes to reach areas agreeing with the classifications and desired service facilities.

Although an instance where the input of a condition for "I wish to go to a ski slope, then a hot spring" in this embodiment was described, it is needless to say that the input of another classification can be processed in a likewise manner. Examples include "I wish to visit art galleries, then go to a hot spring", "I wish to try sky sports, then visit an art gallery", and so forth. Further, for an example of "I wish to try snowboarding" where it is necessary to retrieve ski slopes as well as those that permit snowboards, it can be considered to essentially represent an input of multiple classifications so that the same process can be used.

In this embodiment, other conditions, and not only service classifications (or purposes), can also be input. For example, as shown in FIG. 17, conditions such as the tour complement (couple, solitary traveler, group, and so forth), number of persons, estimated cost, and so forth may be input through input device 110. An input method is desirable where these conditions are displayed as lists and can be properly selected by a cursor. Naturally, to handle these input conditions, it is necessary to store into database 100 data on number of persons and estimated cost for each service facility (such as restaurant A is ideal for couples and the estimated cost is 2000 yen, restaurant B is family oriented and the estimated cost is 800 to 4000 yen). This has an effect of allowing a more detailed itinerary to be planned.

Furthermore, it is possible to store a program for executing the above-mentioned itinerary preparing operation processes of the embodiments onto a computer-readable medium 200. The stored program can be executed by the processor 10. The medium 200 may be, for example, a CD-ROM, a floppy disk, a magnetic disk, an optical disk, a DVD and so on.

What is claimed is:

1. An itinerary preparing apparatus for accessing a database from a terminal and preparing an itinerary, comprising:

input means for specifying a prescribed area as a retrieval condition;

retrieval means for retrieving facilities located within said area; and presenting means for distinguishing service classifications of the facilities obtained from retrieval, and presenting said service classifications on the terminal based on specific conditions which rank said service classifications;

wherein said prescribed area is an area including a route from a start location to a final location;

said prescribed area comprises a set of a plurality of small areas along the route from the start location to the final location; and said presenting means presents, when a plurality of said service classifications exist, classifications for every small area in correspondence to facility need level of the user determined based on the number of facilities and estimated times a user will pass each small area.

2. An itinerary preparing apparatus for accessing a database from a terminal and preparing an itinerary, comprising:

input means for specifying a prescribed area as a retrieval condition;

retrieval means for retrieving facilities located within said area; and presenting means for distinguishing service classifications of the facilities obtained from retrieval, and presenting said service classifications on the terminal based on specific conditions which rank said service classifications;

wherein said prescribed area is an area including a route from a start location to a final location;

said prescribed area comprises a set of plurality of small areas along the route from the start location to the final location; and said presenting means presents, when a plurality of said service classifications exist; classifications for every small area in correspondence to facility need level of the user determined based on the number of facilities and continuous traveling time of the user.

3. An itinerary preparing apparatus for accessing a database from a terminal and preparing an itinerary, comprising:

input means for specifying either an area or service classification as a retrieval condition;

retrieval means for retrieving, based on the specified retrieval condition, said area or service classification that was not specified; and presenting means for presenting results obtained from retrieval, wherein said input means specifies a plurality of service classifications;

said retrieval means calculates the extent of distribution for every area of various service facilities corresponding to the various specified service classifications, and based on results thereof, retrieves an optimum area; and said presenting means presents the optimum area obtained from retrieval.

4. An itinerary preparing apparatus in accordance with claim 3, wherein said retrieval means includes:

counting means for counting the number of said service facilities for every area; and selection means for selecting an area having the largest number of said service facilities as an optimum area.

5. An itinerary preparing apparatus in accordance with claim 4, wherein said retrieval means further includes area changing means for changing the size of areas when the number of service facilities counted by said counting means results in no significant difference between areas; and said counting means recounts the number of service facilities for every area after changing the size.

6. An itinerary preparing apparatus in accordance with claim 3, wherein said input means further specifies a complement of users, and said retrieval means calculates the extent of distribution for every area of service facilities agreeing with the various specified service classifications and complement of users, and based on results thereof, retrieves an optimum area.

7. An itinerary preparing apparatus in accordance with claim 3, further including route searching means for performing a prescribed route searching process using said optimum area, and searching for a recommended route from start location to final location.

8. An itinerary preparing apparatus according to claim 1, wherein, when said estimated times for a particular small area corresponds to meal time, said presenting means presents restaurants in the small area.

9. An itinerary preparing apparatus according to claim 2, wherein, when said continuous traveling time for reaching a particular small area exceeds a prescribed value, said presenting means presents resting facilities in the small area.

* * * * *